March 27, 1928.
R. F. HALL
1,663,548
TRUCK CONSTRUCTION FOR ELECTRIC LOCOMOTIVES
Filed June 18, 1926
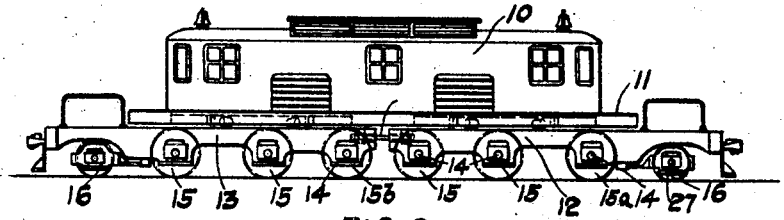
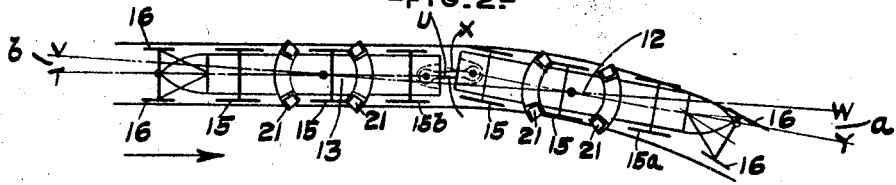
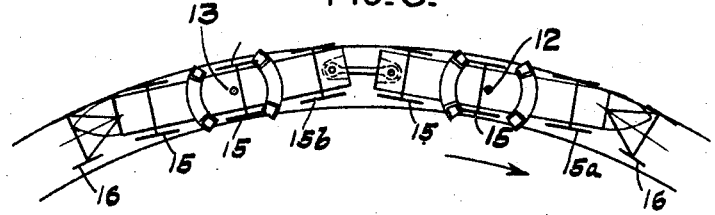
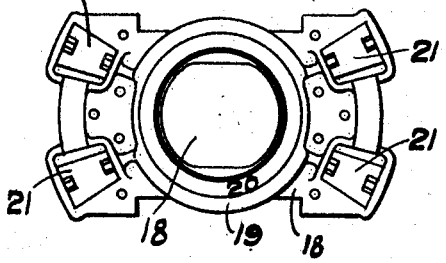
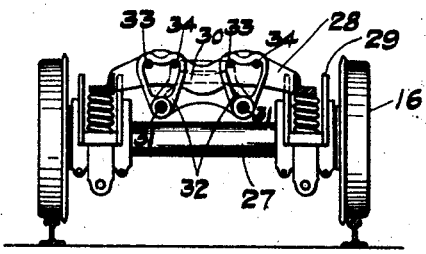
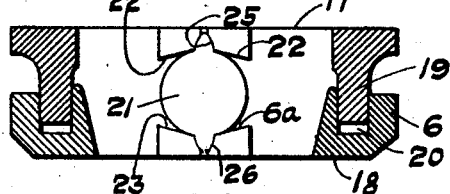
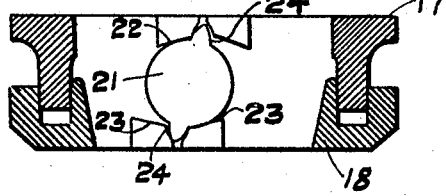
INVENTOR
Robert F. Hall
BY
Clarence Kerr
ATTORNEY Patented Mar. 27, 1928.

1,663,548

UNITED STATES PATENT OFFICE.

ROBERT FRANCIS HALL, OF SCHENECTADY, NEW YORK.

TRUCK CONSTRUCTION FOR ELECTRIC LOCOMOTIVES.

Application filed June 18, 1926. Serial No. 116,797.

This invention relates to electric locomotive truck construction and has for an object to provide a truck structure by which the locomotive is securely guided on curved track and steadied against later oscillations on straight or uneven track. To this end a truck is provided which, in addition to a rigid wheel group, includes a guiding wheel structure having a capacity for lateral swiveling movement with relation to the rigid wheel group. Means are provided for exerting resistance to swiveling of the truck body with relation to the cab and also for exerting resistance to lateral swinging movement of the guiding wheels with relation to the rigid wheel portion of the truck, to thereby exert a steadying action on the moving vehicle.

In the accompanying drawing: Figure 1 is a view, in side elevation, of an electric locomotive, equipped with a truck construction embodying the invention; Fig. 2, a diagrammatic view, showing the relation of parts when one truck is on a straight section of track, while the other truck is on a curved section; Fig. 3, a view, similar to Fig. 2, showing both trucks on a curved track section; Fig. 4, a plan view of a center bearing plate construction used in the invention; Fig. 5, a view, in vertical section, and on an enlarged scale, showing the relation of the center plate parts to each other when the locomotive is on a straight section of track; Fig. 6, a view, similar to Fig. 5, showing the relation of parts when the locomotive is on a curved track section; and, Fig. 7, a transverse sectional view, on an enlarged scale, of a truck showing means for resisting lateral displacement of the bolster.

In the practice of my invention, referring descriptively to the specific embodiment thereof which is herein exemplified as applied in an electric locomotive, the cab or superstructure 10 has an underframe 11, which is supported on a pair of trucks 12 and 13, each of which has a swiveled relation to the cab.

The trucks shown in Figure 1 have associated therewith three axles 14 mounted in a fixed and substantially parallel relation with each other. The three axles and the six driving wheels 15 carried thereby form a rigid wheel group. Each truck has also associated therewith a pair of wheels 16 which are not driven but serve as load-carrying and guiding wheels and are arranged to have lateral pivotal movement with relation to that portion of the truck associated with the rigid wheel group.

The connecting structure between the cab and the trucks which permits of a swiveling action of the trucks includes a body center plate member 17 and a truck center plate member 18 provided respectively with an annular rib or flange 19 and an annular groove 20. With this arrangement swiveling or angular movement of the truck center plate with relation to the cab center plate is provided by the rotation of the flange 19 carried by the body center plate in the groove 20 formed in the truck center plate 18.

A feature of the construction resides in the provision of means for creating resistance to angular or rotative movement of the truck out of a normal position in which the longitudinal axis of the truck is parallel to the longitudinal axis of the cab. This feature follows in a general way the construction described in application for patent Serial No. 107,312, filed May 7, 1926, by Charles W. Todd, and includes the use of frusto-conical or tapered rollers 21 seated between oppositely inclined surfaces 22 and 23 formed, respectively, on the cab center plate member 17 and the truck center plate member 18. Tooth members 24 carried at diametrically opposite points adjacent the ends of the rollers 21 are arranged to engage notches 25 and 26 formed at the lines of junction of the inclined surfaces 22 and 23. With this construction it will be seen that with the arrangement of parts shown in Figure 5, corresponding to straight track conditions, the roller 21 occupies a central position between the inclined seating surfaces. In Figure 6, however, in which a change in the relative angular positions of the cab and truck center plates is indicated, the roller 21 is so engaged between two of the inclined faces 22 and 23 as to lift the body plate 17 slightly with relation to the truck plate 18. It will be clear that this lifting action is opposed or resisted by the weight of the cab 10 and that angular rotation of the truck out of straight-ahead alinement with the body of the locomotive is correspondingly resisted with the result that the swinging of the superstructure about a curve is facilitated.

Provision is made also for resisting lateral movement of the guide wheels 16 out of a line of travel parallel to the longitudinal axis of the truck as a whole. Referring to Figure 7 of the drawings the truck guide wheels 16 are connected by the axle 27, which supports a swing frame 28 on the helical springs 29. A bolster member 30 takes the weight of the load and is supported at 31 in the lower extremities of a pair of swing link members 32 resting on two sets of supporting pins 33 and 34. With this structural arrangement it will be seen that movement of the wheels 16 laterally on a curved section of track causes the swing link members 32 supporting the bolster to swing about one or the other sets of pins 33 or 34 thereby lifting the bolster and load carried thereby. It will thus be seen that the weight carried by the guide wheels 16 is utilized to yieldingly resist lateral displacement of the bolster of the guide wheel unit with relation to the truck as a whole, thereby adding still further to steadying the action of the locomotive against lateral oscillations and to assist in swinging or guiding the trucks about curved sections of track.

Referring to Figure 2 of the drawings it will be seen that the rearward truck of the locomotive is upon a straight or tangent section of track while the forward truck is upon a curved section. In this relation of parts the longitudinal center line X—Y of the forward truck forms an angle $a$ with the longitudinal center line V—W of the superstructure, and the longitudinal center line T—U of the rear truck forms an angle $b$ with the line V—W. It will be seen that angle $b$ made by the rear truck is substantially less than the angle $a$ made by the forward truck and, because of the play between the various parts, angle $b$ may be reduced to zero. Angle $a$, however, made by the forward truck is sufficient to bring the rotation-resisting structure between the forward truck and the superstructure into action and to set up a torque which tends to rotate the superstructure toward the inner rail or into alinement with the truck.

In Figure 3 of the drawings a condition is shown in which both the forward and the rearward trucks of the locomotive are on curved sections of track. As in the condition presented in Figure 2, the relation between the forward truck and the superstructure is such that the rotation-resisting device tends to swing the structure inwardly about the curve and to increase the flange pressure of the forward driving wheel against the outer rail. This outward pressure is counteracted by the resistance to lateral movement embodied in the guide wheel unit $15^a$.

In the rearward truck, the lateral resistance device in the guide wheel unit $15^b$ creates a condition tending to increase the pressure of the forward wheel of the rear truck against the outer rail while the rotation resisting structure between the truck and the superstructure tends to decrease the pressure of the forward wheel against the outer rail. By a suitable arrangement of the relations of the resistance devices to each other any desired balancing or equalization of pressures may be obtained. For example, the flange pressure of the forward drivers in each truck against the outer rail may be equalized or other desirable relation obtained.

While there is shown and described a six-wheel rigid wheel group in each truck with a two-wheel guiding wheel unit, it will be clear that variations may be made in the number of wheels used, as well as in details of the swiveling resistance structure, without departure from the invention as defined by the appended claims.

The invention claimed and desired to be secured by Letters Patent is:

1. In a railway vehicle, a body portion, a plurality of trucks on which the body portion is supported, said trucks having swiveled connections with the body portion, means in said swiveled connections for yieldingly resisting swiveling action of the trucks, and a set of guide wheels for each truck, said guide wheels being mounted for lateral swiveling action with relation to the associated trucks and cooperating with the resisting means in the swiveled connections of the trucks to accomplish the guiding action.

2. In an electric locomotive, a body portion, a plurality of trucks on which the body portion is supported, said trucks having swiveled connections with the body portion, each truck including a plurality of sets of wheels maintained in relatively rigid alinement with each other and a set of guide wheels adapted to partake of a swiveling action with relation to said rigidly maintained wheels, and means for yieldingly resisting swiveling action of said guide wheels with relation to said rigidly maintained wheels whereby to assist the swiveling action of the trucks on curved track.

3. In an electric locomotive, a body portion, a plurality of trucks on which the body portion is supported, said trucks having swiveled connections with the body portion, means on said swiveled connections for yieldingly resisting swiveling action of the trucks, a set of guide wheels for each truck, said guide wheels being mounted for lateral swiveling action with relation to the associated truck, and means for yieldingly resisting swiveling action of the guide wheels with relation to the trucks whereby to assist the turning of the trucks with the guide wheels.

4. In an electric locomotive, a body portion, a plurality of trucks on which the body portion is supported, said trucks having swiveled connections with the body portion, means included in said swiveled connections for applying the weight of the body portion to resist relative angular movement of the truck and body portion whereby to facilitate the swinging of the body portion about a curve in the track, and a set of guide wheels for each truck, said guide wheels being mounted for lateral swinging action with relation to the associated trucks.

5. In an electric locomotive, a body portion, a plurality of trucks on which the body portion is supported, said trucks having swiveling connections with the body portion, each truck including a set of guide wheels connected to the truck for lateral swiveling action with relation thereto, and means for applying a portion of the weight of the body portion to resist relative swiveling movement of the guide wheels and the truck whereby to facilitate movement of a truck about a curved track section.

6. In an electric locomotive, a body portion, a plurality of trucks on which the body portion is supported, said trucks having swiveled connection with the body portion, means included in said swiveled connections for applying the weight of the body portion to resist relative angular movement of the truck and body portion whereby to facilitate the swinging of the body portion about a curve in the track, a set of guide wheels connected to the truck for lateral swiveling action with relation thereto, and means for applying a portion of the weight of the body portion to resist relative swiveling movement of the guide wheels and the truck whereby to facilitate movement of the truck about a curved track section.

ROBERT FRANCIS HALL.